United States Patent
Chen et al.

(10) Patent No.: US 10,770,993 B2
(45) Date of Patent: Sep. 8, 2020

(54) POWER TOOL

(71) Applicant: Nanjing Chervon Industry Co., Ltd., Nanjing (CN)

(72) Inventors: Weipeng Chen, Nanjing (CN); Dezhong Yang, Nanjing (CN); Wencheng Li, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 16/368,227

(22) Filed: Mar. 28, 2019

(65) Prior Publication Data
US 2019/0334459 A1 Oct. 31, 2019

(30) Foreign Application Priority Data

Apr. 28, 2018 (CN) .......................... 2018 1 0400941
Jun. 26, 2018 (CN) .......................... 2018 1 0665574
Sep. 27, 2018 (CN) .......................... 2018 1 1127423

(51) Int. Cl.
*H02P 6/08* (2016.01)
*B25F 5/00* (2006.01)
*H02P 6/10* (2006.01)

(52) U.S. Cl.
CPC .................. *H02P 6/08* (2013.01); *B25F 5/00* (2013.01); *H02P 6/10* (2013.01)

(58) Field of Classification Search
CPC ................................... H02P 6/08; H02P 6/10
USPC .................................................. 318/599, 560
See application file for complete search history.

(56) References Cited

U.S. PATENT DOCUMENTS

| 6,392,373 | B1 * | 5/2002 | Glasgow | .................. | H02P 7/04 200/1 R |
| 8,067,913 | B2 * | 11/2011 | Watabe | ..................... | B25F 5/00 318/244 |

* cited by examiner

*Primary Examiner* — David Luo
(74) *Attorney, Agent, or Firm* — Greenberg Traurig, LLP

(57) ABSTRACT

A duty ratio under different working conditions is determined according to an analysis of a characteristic parameter x of a motor of a power tool and then a drive circuit is controlled with the duty ratio to drive the motor to operate. It is only needed to calculate the duty ratio without needing to make any variable to the circuit hardware or the mechanical structure of the power tool. That is, the duty ratio can be adjusted to achieve optimized control of the motor, thereby optimizing the working performance such as an output torque of the power tool.

15 Claims, 6 Drawing Sheets

POWER TOOL

CROSS-REFERENCES TO RELATED APPLICATIONS

This application claims priority to Chinese Patent Application No. 201810400941.2 filed on Apr. 28, 2018, Chinese Patent Application No. 201810665574.9, filed on Jun. 26, 2018, and Chinese Patent Application No. 201811127423.4, filed on Sep. 27, 2018, the disclosures of which are incorporated herein by reference in their entirety.

TECHNICAL FIELD

The following relates to the field of power tools, and in particular, to control of a motor in a power tool.

BACKGROUND

An existing power tool may be powered by a battery pack and a motor is driven by a drive circuit to operate. However, in the current power tool, especially a hand-held power tool based on a 1P battery pack, the impulse current of the battery pack and an output torque of the motor are difficult to control under heavy loads. Here, the 1P battery pack refers to a battery pack composed of a plurality of single battery cells connected in series.

The existing power tool, especially a circular saw or an electric drill, will have a maximum impulse current up to 100 A or above in the locked rotor state. A High impulse current will seriously damage the power supply device of the power tool, such as the battery pack, thereby affecting the safety of the power tool.

Therefore, for safety reasons, the existing power tool is provided with an overload protection device, but the device would directly turn off the motor when the heavy loads of the power tool reach a preset threshold to prevent a current of the motor from impacting the power supply device. In this overload protection mode, the motor generally needs to be turned off when the maximum output torque of the hand-held power tool reaches 3.5N·m. That is, the practical load the power too can bear is only 3.5N·m. Under heavy loads, the anti-blocking capability and user experience of the existing power tool are difficult to meet the requirements.

Therefore, there is an urgent need to increase the maximum output torque of the power tool.

SUMMARY

To solve deficiencies in the related art, an object of the subject disclosure is to provide a power tool.

To achieve the object, the subject disclosure adopts the technical solutions described below in connection with an example power tool.

An example power tool includes a motor including a stator and a rotor, a transmission device configured to connect the rotor to a tool accessory, a drive circuit configured to output a switch signal to drive the rotor of the motor to operate, a control unit configured to output a drive signal to control the drive circuit, and a power supply device configured to supply power to the motor, the drive circuit and the control unit. The control unit is configured to determine a variable $\Delta PWM$ of a duty ratio according to a variable $\Delta x$ of a characteristic parameter of the motor, where the variable $\Delta PWM$ of the duty ratio is obtained by a function $f(\Delta x)$ and ranges from 0.01 to 0.1, and according to the variable $\Delta PWM$ of the duty ratio, output the drive signal to the drive circuit to control the rotor of the motor to operate to output a driving force.

In some examples, the power tool further includes a motor detection module configured to detect and obtain the characteristic parameter x of the motor, where the motor detection module is integrated into the control unit or disposed separated from the control unit.

In some examples, the characteristic parameter x of the motor includes at least one selected from the group consisting of a motor speed, a current, and an output torque.

In some examples, the power supply device includes a battery pack composed of a plurality of single battery cells connected in series.

In some examples, the variable $\Delta x$ of the characteristic parameter of the motor is a variable $\Delta n$ of a motor speed.

In some examples, when the variable $\Delta n$ of the motor speed ranges from 500 rpm to 1000 rpm, the corresponding variable $\Delta PWM$ of the duty ratio ranges from 0.02 to 0.05 and, when the variable $\Delta n$ of the motor speed ranges from 1000 rpm to 1500 rpm, the corresponding variable $\Delta PWM$ of the duty ratio ranges from 0.05 to 0.08.

Another example power tool includes a motor including a stator and a rotor, a transmission device configured to connect the rotor to a tool accessory, a drive circuit configured to output a switch signal to drive the rotor of the motor to operate, a control unit configured to output a drive signal to control the drive circuit, and a battery pack, configured to supply power to the motor, the drive circuit and the control unit. The control unit is configured to determine a variable $\Delta PWM$ of a duty ratio according to a variable $\Delta x$ of a characteristic parameter of the motor, where the variable $\Delta PWM$ of the duty ratio is obtained with a function $f(\Delta x)$ and ranges from 0.1 to 0.2, the drive signal is outputted, according to the variable $\Delta PWM$ of the duty ratio, to the drive circuit to control the rotor of the motor to operate to output a driving force.

In some examples, the characteristic parameter x of the motor includes at least one selected from the group consisting of a motor speed, a current, and an output torque.

In some examples, the variable $\Delta x$ of the characteristic parameter of the motor is a variable $\Delta n$ of a motor speed.

In some examples, when a variable $\Delta n$ of a motor speed ranges from 500 rpm to 1000 rpm, the corresponding variable $\Delta PWM$ of the duty ratio ranges from 0.02 to 0.05 and, when the variable $\Delta n$ of the motor speed ranges from 1000 rpm to 1500 rpm, the corresponding variable $\Delta PWM$ of the duty ratio ranges from 0.05 to 0.08.

Yet another example of the present invention provides a power tool. The power tool includes a brushless motor including a stator and a rotor; a transmission device configured to connect the rotor to a tool accessory; a drive circuit configured to output a switch signal to drive the rotor of the brushless motor to operate; a control unit configured to output a drive signal to control the drive circuit; and a power supply device, configured to supply power to the brushless motor, the drive circuit and the control unit. The control unit is configured to determine a variable $\Delta PWM$ of a duty ratio according to a variable $\Delta x$ of a characteristic parameter of the motor and a characteristic parameter V of the power supply device, where the variable $\Delta PWM$ of the duty ratio is obtained with a function $f(\Delta x, V)$ and ranges from 0.01 to 0.2; the drive signal is outputted, according to the variable $\Delta PWM$ of the duty ratio, to the drive circuit to control the rotor of the brushless motor to operate to output a driving force.

In some examples, the control unit is configured to determine the variable ΔPWM of the duty ratio according to the variable Δx of the characteristic parameter of the motor, a number of P of a battery pack and the characteristic parameter V of the power supply device, where the variable ΔPWM of the duty ratio is obtained with a function f(Δx, V, P) and ranges from 0.01 to 0.1 or ranges from 0.1 to 0.2, the drive signal is outputted, according to the variable ΔPWM of the duty ratio, to the drive circuit to control the rotor of the brushless motor to operate to output the driving force.

In some examples, the power tool has a maximum output torque greater than or equal to 5N·m.

In some examples, the variable Δx of the characteristic parameter of the motor is a variable Δn of a motor speed.

In some examples, when a variable Δn of a motor speed ranges from 500 rpm to 1000 rpm, the variable ΔPWM of the duty ratio ranges from 0.02 to 0.05 and, when the variable Δn of the motor speed ranges from 1000 rpm to 1500 rpm, the variable ΔPWM of the duty ratio ranges from 0.05 to 0.08.

The beneficial effects are described below.

The subject disclosure determines the duty ratio under different working conditions according to an analysis of the characteristic parameter of the motor. When applied to a power tool, such as a circular saw or an electric drill, the corresponding duty ratio may be obtained by querying a table or through calculations according to the characteristic parameter x of the motor obtained in real time and the drive signal is outputted according to the duty ratio to control the motor to operate, thereby optimizing performances of the power tool.

The subject disclosure acquires the characteristic parameter V of the power supply device and the characteristic parameter x of the motor by use of the existing circuit hardware or mechanical structure of the power tool, and then the duty ratio may be obtained by merely adding a simple table look-up or computing control, so as to achieve optimal control of the motor. In particular, the maximum output torque of the power tool can be controlled to be not less than 5N·m in some cases.

DETAILED DESCRIPTION

The various aspects of the subject disclosure will be described below in detail in conjunction with the accompanying drawings and specific examples.

The motor control method and system provided by the subject disclosure can be applied to most hand-held power tools. Duty ratios under different working conditions is obtained by mere analyses of a characteristic parameter V of a power supply device and/or a characteristic parameter x of a motor. In a power tool, a corresponding duty ratio is determined according to the characteristic parameter V of the power supply device and/or the characteristic parameter x of the motor acquired in real time, to control a drive circuit based on the determined duty ratio to drive the motor to operate, thereby optimizing a maximum impulse current of the power tool and a maximum output torque of the power tool.

Figure 1:
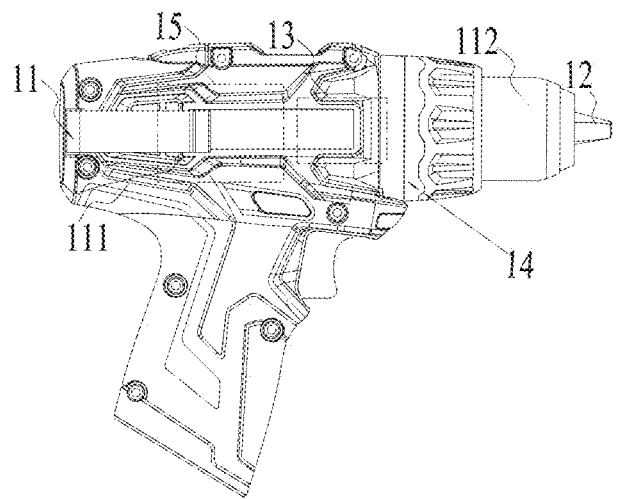
FIG. 1 is a schematic diagram illustrating an external structure of an electric drill according to a first example of the subject disclosure.

The specific examples of the subject disclosure are described below by taking three typical power tools as examples. In a first example of the subject disclosure, an electric drill as shown in FIG. 1 includes a housing 11, an output member 12, a motor 13, a transmission assembly 14, a printed circuit board (PCB) 15, and a power supply device 16. The housing 11 is configured to accommodate the motor 13, the transmission assembly 14, the PCB circuit structure, etc., and an end of the housing 11 is further configured to mount the output member 12. The motor 13, the PCB circuit structure 15, and the power supply device 16 are invisible in the view of FIG. 1 due to being blocked by the housing 11. In a front-rear orientation, the housing 11 may further include a main housing portion 111 and a head housing portion 112. The main housing portion 111 may be configured to accommodate the motor 13, the transmission assembly 14 and the PCB circuit structure 15. The head housing portion 112 may be connected to the output member 12. In a left-right orientation, the main housing portion 111 may be symmetrically disposed with respect to a section of a structure illustrated in FIG. 2. On both sides of the section, the main housing portion 111 may include a left housing portion and a right housing portion symmetrical to each other, respectively. The output member 12 is configured to output a power. For example, for the electric drill, the output member 12 may be specifically selected as a chuck capable of gripping a drill bit. The motor 13, the transmission assembly 14 and the PCB circuit structure 15 are all disposed within the housing 11. The power supply device 16 is configured to supply power to each electronic device within the electric drill. The PCB circuit structure 15 is configured to control the motor 13 to operate. The motor 13 is configured to drive the transmission assembly 14. The transmission assembly 14 is configured to transfer the power outputted from the motor 13 to the output member 12 so as to drive the output member 12 to output power.

Figure 2:
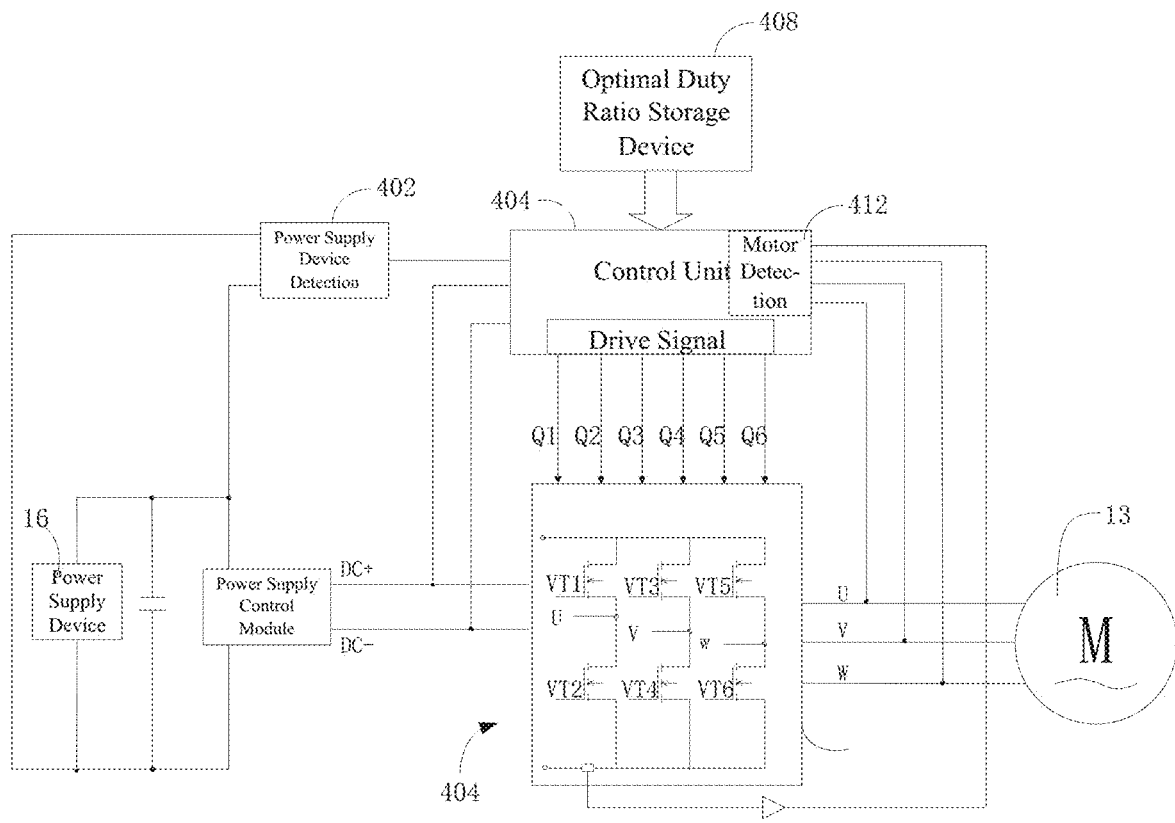
FIG. 2 is a schematic diagram of an internal circuit system according to the first example of the subject disclosure.

To control the motor 13 to operate, referring to FIG. 2, the above PCB circuit structure 15 may specifically include the following circuit hardware: a power supply control module 400, a power supply device detection module 402, a control unit 404, a drive circuit 406, and an optimal duty ratio storage device 408. The power supply control module 400, the power supply device detection module 402, the control unit 404, the drive circuit 406, the optimal duty ratio storage device 408 and the motor 13 are all enclosed by the housing 11.

The power supply device 16 of the hand-held electric drill illustrated in FIG. 2 may be selected as a battery pack or an alternating current (AC) power supply. The battery pack may be composed of a group of battery units. For example, in this example, single battery cells or battery units may be connected in series to form a single power supply branch to form a 1P battery pack. An output voltage of the battery pack is varied by a specific power supply control module 400, to output an appropriate supply voltage to the power supply device detection module 402, the control unit 404, the drive circuit 406, the optimal duty ratio storage device 408 and the motor 13, etc., and supply power to them. It is understandable by those skilled in the art that the power supply device 16 may also be selected as the AC power supply. An inputted alternating current may be converted by the corresponding power supply control module, which may also supply power to the power supply device detection module 400, the control unit 404, the drive circuit 406, the optimal duty ratio storage device 408, and the motor 13, etc.

The power supply control module 400 may be implemented by a selected dedicated power chip or directly through a hardware circuit. Taking the AC power supply as an example, rectification, filtering, voltage division, and reduction voltage are performed on an AC signal outputted from the power supply through the hardware circuit to implement the power supply control module 400.

Referring to FIG. 2, the drive circuit 406 is electrically connected to three-phase electrodes U, V and W of the motor 13 to drive the motor to operate. The drive circuit 406 includes a switch circuit 410 configured to output a drive signal to the three-phase electrodes of the motor 13 according to the control of the controller 404, so as to control a rotor of the motor 13 to operate. The drive circuit 406 has an input end, an output end, and a sampling end. As illustrated in FIG. 2, the switch circuit 410 includes switch elements VT1, VT2, VT3, VT4, VT5, and VT6. Field effect transistors, IGBT transistors and the like may be selected as the switch elements VT1 to VT6. In this example, taking the field effect transistors as an example, a gate electrode of each switch element is used as an input end of the drive circuit 406 and is electrically connected to a drive signal port of the controller 404, and a drain electrode or a source electrode of each switch element is electrically connected to a stator of the motor 13. The switch elements VT1 to VT6 change a conducting state according to the drive signal outputted from the controller 404 to change a voltage state that the battery pack applies to windings of a brushless motor to drive the motor 13 to operate.

To rotate the motor 13, the drive circuit 406 has a plurality of drive states. In one drive state, the stator of the motor 13 generates a magnetic field and the control unit 404 is configured to output the corresponding drive signal to the drive circuit 406 according to a rotational position of the rotor of the motor 13 to enable the drive circuit 406 to switch the drive state, so that the magnetic field generated by the stator rotates to drive the rotor to rotate then to drive the motor 13. In this example, the rotational position of the rotor of the motor 13 may be calculated by a motor detection module 412 in the controller 404 through sampling a bus current and/or a terminal voltage of the motor 13.

The control unit 404 is configured to determine a variable $\Delta PWM$ of a duty ratio according to a variable $\Delta x$ of a characteristic parameter of the motor 13. The variable $\Delta PWM$ of the duty ratio is obtained by a function $f(\Delta x)$. That is to say, the characteristic parameter x of the motor 13 changes within every fixed variable $\Delta x$ and the control unit 404 determines a fixed variable $\Delta PWM$ of the duty ratio according to the fixed variable $\Delta x$ of the characteristic parameter x of the motor 13. According to the variable $\Delta PWM$ of the duty ratio, the drive signal is outputted to the drive circuit 406 to control the rotor of the motor 13 to operate to output a driving force. It will be described below in detail.

In some examples, the control unit 404 may be further configured to determine the variable $\Delta PWM$ of the duty ratio according to the variable $\Delta x$ of the characteristic parameter of the motor 13 and a characteristic parameter V of the power supply device 16. The variable $\Delta PWM$ of the duty ratio is obtained by a function $f(\Delta x, V)$.

In some examples, the control unit 404 may be further configured to determine the variable $\Delta PWM$ of the duty ratio according to the variable $\Delta x$ of the characteristic parameter of the motor 13, a number of P of the battery pack and the characteristic parameter V of the power supply device 16. The variable $\Delta PWM$ of the duty ratio is obtained by a function $f(\Delta x, V, P)$.

Figure 9:
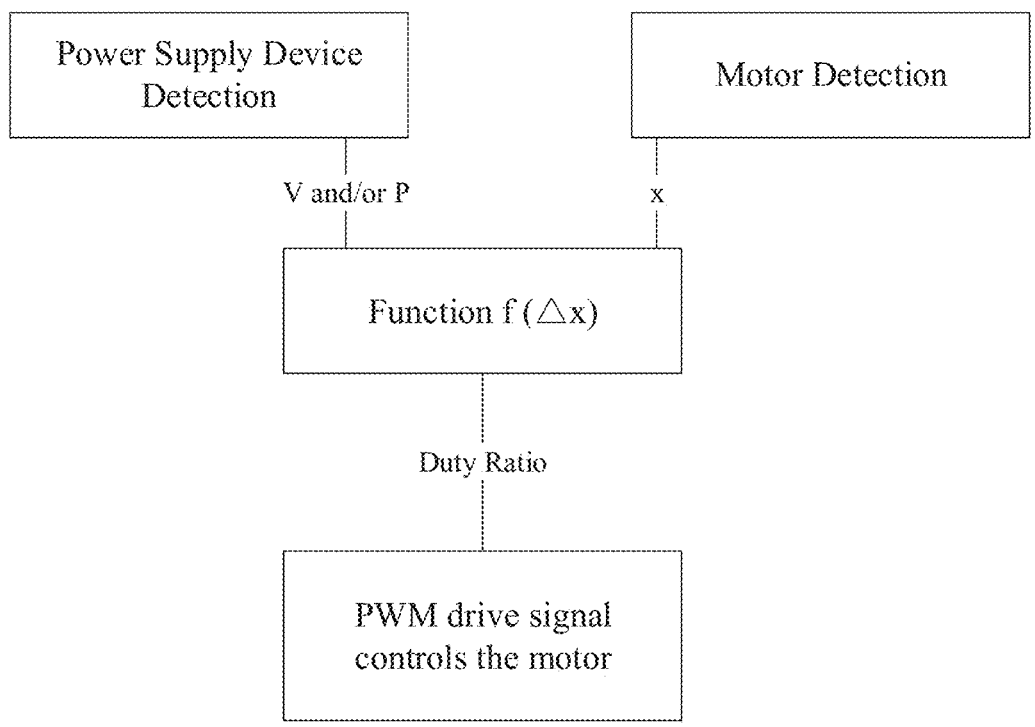
FIG. 9 is a flowchart of a motor control method according to a first example of the subject disclosure.

Functional operation results for the above characteristic parameters of the motor 13 and the like may be pre-stored in the optimal duty ratio storage device 408 and obtained by the control unit 404 by querying the optimal duty ratio storage device 408. An adjustment process of the duty ratio may refer to FIG. 9 and be described below.

First, the motor detection module 412 samples the motor 13 and obtains the characteristic parameter x of the motor 13 by calculating. The characteristic parameter x of the motor 13 may include, but is not limited to, a motor speed n, a position of the stator or rotor, a torque, a current of the motor, and the like. An optimal duty ratio in the working condition of this tap position is obtained by calculating with the function $f(\Delta x)$ according to the practical working condition of the battery pack and the characteristic parameter x of the motor 13. The drive signal in a form of a pulse width modulation (PWM) is determined according to the duty ratio. The corresponding drive signal is outputted to the drive circuit 406 according to the rotational position of the rotor of the motor 13 and the duty ratio. Therefore, the drive circuit 406 drives the motor 13 according to the drive signal.

Here, the optimal duty ratio may be fixedly stored in a storage device. For example, the optimal duty ratios obtained by calculating with the function $f(\Delta x)$ under different working conditions are stored in advance based on the analysis of the characteristic parameter x of the motor 13 to generate a PWM table. Therefore, the controller 404 may obtain the duty ratio directly by querying data in the storage device and output the corresponding drive signal according to the duty ratio, thereby optimizing performance of the current electric drill. Specifically, by selecting the optimal duty ratios under different working conditions, a current $I_b$ on a power supply side and a current $I_m$ on a motor side may be optimized. For example, when the same current $I_m$ on the motor side is obtained by adjusting the duty ratio via the function $f(\Delta x)$, that is, when the performances of the motors are the same, the duty ratio which makes the current $I_b$ on the power supply side smaller is friendlier to the power supply device. By selecting the duty ratio of the drive signal in the PWM form in such a manner, the subject disclosure can effectively control a maximum impulse current of the battery pack and ensure a maximum output torque of the motor 13 when necessary, thereby optimizing the overall working performance of the power tool. The optimum duty ratios under different working conditions will be described in detail below in conjunction with the principles illustrated in FIG. 7 and FIG. 8.

In the circuit hardware in this example, all the power supply device detection module 402, the motor detection module 412, and the optimal duty ratio storage device 408 may be implemented by a dedicated chip or may be directly implemented in the control unit 404 through function modules integrated into the control unit 404. The control unit 404 may be implemented by selecting a digital signal processor (DSP) chip, an Advanced (Reduced instruction set computer (RISC)) Machine (ARM) chip, a Microcontroller Unit (MCU) and the like according to requirements of the power tool on internal data signal processing.

Figure 10:
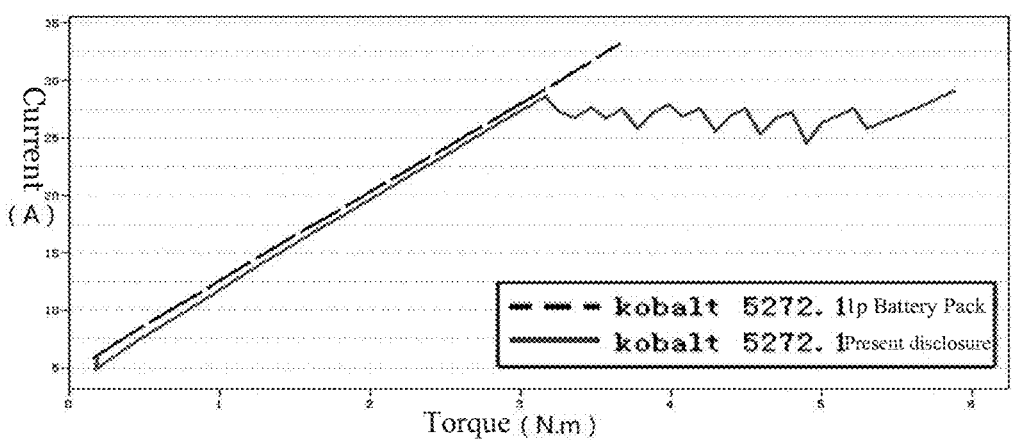
FIG. 10 is a comparison diagram of a maximum impulse current in a first example of the subject disclosure compared to the related art.

Referring to a comparison chart of experimental data illustrated in FIG. 10, in a test for the maximum impulse current, the electric drill using the above technology can limit the maximum impulse current to be under 30 A when the torque reaches above 3N·m, as illustrated by a solid line in FIG. 10. However, as indicated by a dashed line in FIG. 10, the maximum impulse current of the existing electric drill using the prior art becomes larger with the torque and quickly exceeds a limit of 30 A. An excessive impulse current will damage the power supply device 16 of the electric drill. Especially when powered by a direct current (DC) power supply, the temperature of the battery pack is greatly increased, which affects the service life of the battery pack. By adopting the technology according to the subject disclosure, the electric drill would still be friendly to the battery pack under a heavy load with a large torque and can effectively avoid irreversible damage to the battery pack caused by an overcurrent and temperature rise.

Figure 11:
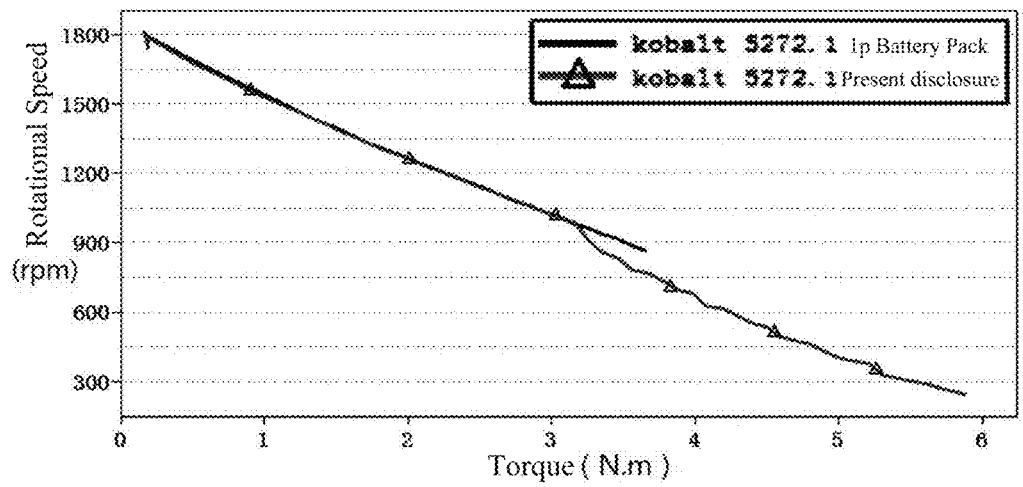
FIG. 11 is a comparison diagram of a heavy load torque in a first example of the subject disclosure compared to the related art.

FIG. 11 is a comparison diagram of maximum output torques under a heavy load of an electric drill using the technology of the subject disclosure compared with an electrical drill using the prior art. As illustrated by a solid line in FIG. 11, the electric drill using an existing overload protection mechanism starts overhead protection after the output torque reaches 3.7N·m and causes the motor to be locked and stop operating. However, as illustrated by a curve marked with triangles in FIG. 11, the electric drill using the technology of the subject disclosure maintains the current below an overload threshold under the heavy load so that the output torque may reach nearly 6N·m, which is close to 2 times the output torque in the prior art.

Figure 12:
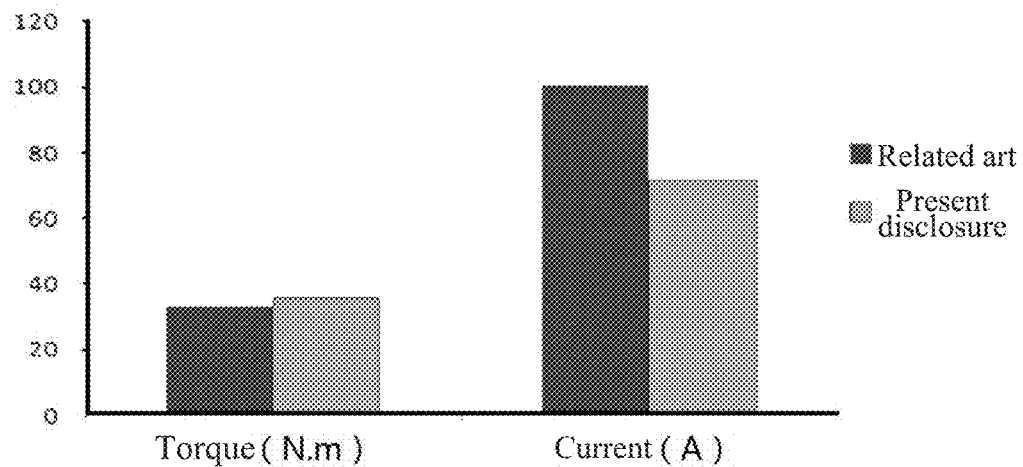
FIG. 12 is a comparison diagram of a locked rotor test in a first example of the subject disclosure compared to the related art.

FIG. 12 shows comparison data of an electric drill using the technology of the subject disclosure compared with an electrical drill using the prior art in a locked rotor test. When the motor 13 has a completely locked rotor, and the speed is close to 0 or a back electromotive force is close to 0, the electric drill using the prior art, as illustrated by a dark color in FIG. 12, has an output torque of only 33N·m and a maximum impulse current as high as 100 A; however, the electric drill using the technology of the subject disclosure, as illustrated by a light color in FIG. 12, has an output torque of 36N·m which is 10% higher than that in the prior art and a maximum impulse current of only 70 A which is 30% lower than that in the prior art. Thus, the electric drill using the technology of the subject disclosure is friendlier to the battery pack.

Figure 3:
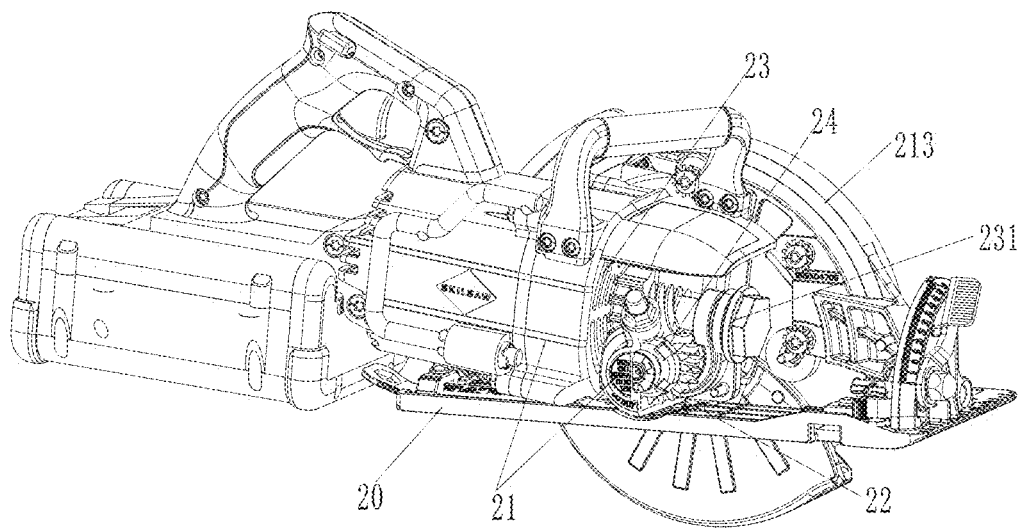
FIG. 3 is a schematic diagram illustrating an external structure of a circular saw according to a second example of the subject disclosure.

In a second example according to the subject disclosure, a hand-held circular saw is shown in FIG. 3, and a mechanical structure of the circular saw specifically includes: a bottom plate 20, a housing 21, a saw blade cover 213, a saw blade shaft 22, a motor 23, a motor shaft 231 and a transmission device 24. The bottom plate 20 is configured to contact a workpiece. The housing 21 is mounted on the bottom plate. The saw blade cover 213 is connected to the housing. The saw blade shaft 22 is configured to rotate a saw blade in the blade cover to cut the workpiece. The motor 23 is disposed within the housing and includes a stator and a rotor. The motor shaft 231 is driven by the rotor of the motor. The transmission device 24 is configured to connect the motor shaft and the saw blade shaft to transfer a rotational motion of the motor shaft to the saw blade shaft to drive the saw blade to operate. The transmission device may specifically include a speed reduction mechanism, such as a reduction gear box, or a worm gear and a worm that engage with each other. The worm gear and worm or the reduction gear box may include a gear structure with different gear ratios or a synchronous belt transmission structure with different radials of synchronous wheels. In an exemplary example of the present invention, the motor is a brushless motor.

Figure 4:
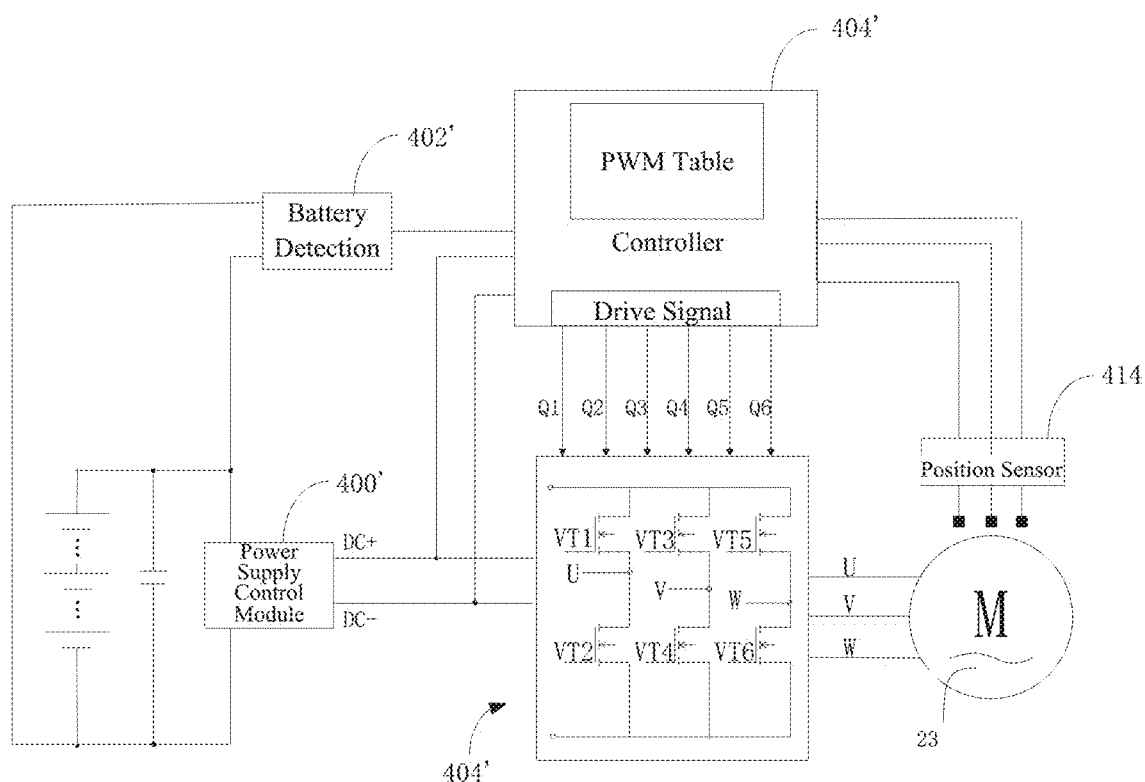
FIG. 4 is a schematic diagram of an internal circuit system according to the second example of the subject disclosure.

The operation of the hand-held circular saw described above also relies on electronic components mounted on a PCB 25. The PCB 25 is accommodated in the housing 21 and is not exposed from the perspective of FIG. 3. Referring to FIG. 4, the PCB 25 specifically includes the following circuit hardware: a power supply control module 400', a battery detection module 402', a controller 404', and a drive circuit 406'. The power supply control module 400', the battery detection module 402', the controller 404', the drive circuit 406', and the motor 23 are all enclosed by the housing 21. The controller 404 further stores, temporarily stores, or buffers data of a PWM table. The data of the PWM includes duty ratios of ΔPWM modulated signals, i.e., duty ratios of drive signals, generated with a function f(Δx, V) under characteristic parameters V of different power supply devices and/or characteristic parameters x of different motor.

Referring to FIG. 4, the electronic components of the hand-held circular saw cooperate in a same manner as the electronic devices of the electric drill in the first example. The difference only lies in that a control unit in this example is specifically selected as a controller with a storage function. In this example, the circular saw is directly powered by a battery pack and a rotational position of the rotor of the motor is directly acquired by a position sensor 414, so information about a motor speed may be acquired through simple calculations by the controller 404'. Therefore, the motor speed n may be selected as a specific characteristic parameter of the motor 23. In this way, the characteristic parameter x of the motor 23', i.e., the motor speed n in this example, may be detected by detecting and calculating a signal of the position sensor 414. Therefore, in this example, the step of sampling the bus current, the phase current or the terminal voltage of the motor in the first example may be omitted and complicated operations of these sampling signals by the controller is omitted. The detection of the motor speed n by the motor detection module 412 may be implemented by the position sensor 414 in conjunction with simple calculations such as accumulation, timing or integral operations in the controller.

A duty ratio of the drive signal outputted by the controller 404' is similar to that in the first example and is obtained by querying the PWM table which simplifies the calculation of the function f(Δx, V). A query process may also refer to FIG. 9.

The battery detection module 402' samples and acquires a practical working condition of the battery pack, such as a voltage V of the battery pack, as a specific characteristic parameter of the power supply device. Of course, the characteristic parameter V of the power supply device is not limited to the voltage of the battery pack, and may also be a voltage of the power supply device, a current of the battery pack, temperature, remaining power, a State of Charge (SOC) parameter (which is generally a ratio of a charging capacity to a rated capacity of the battery pack) of the battery pack, internal resistance of the power supply device, and the like. The rotational position of the rotor of the motor 23 is acquired by the position sensor 414 and a change rate of the rotational position of the rotor is calculated by the controller 404', thereby obtaining the motor speed n as the specific characteristic parameter x of the motor 23. The PWM table is searched for a corresponding tap position according to the voltage V of the battery pack and the motor speed n, then an optimal duty ratio, which is calculated with the function f($\Delta$n, V) under this working condition correspondingly, may be obtained. The drive signal in the PWM form is determined according to the duty ratio, and the corresponding drive signal is outputted to the drive circuit 406' according to the rotational position of the rotor of the motor and the duty ratio. Therefore, the drive circuit drives the motor 23 according to the drive signal. In the function f($\Delta$n, V), $\Delta$n represents a variable of the motor speed.

Specifically, in this example, data of the duty ratios stored in the PWM table and corresponding to values of the function f($\Delta$n, V) may be stored according to the following table structure. Each unit of the table may store the optimal duty ratios under different working conditions, that is, in this example, the data of the duty ratios corresponding to different voltages V of the battery pack and different motor speeds n are stored. For example, when the practical working condition of the battery pack obtained by the battery detection module 402' falls into a case of the voltage V1 of the battery pack and the control module 404' determines that the characteristic parameter x of the motor 23 falls into a case of N3~N4 according to the motor detection module or the position sensor 414, the controller 404' searches the table and selects to output the drive signal at a duty ratio, duty2, to the drive circuit 406', and the drive circuit 406' drives the motor to operate according to the drive signal. Here, a specific selection of the duty ratios (duty1, duty2, . . . ) according to the function f($\Delta$n, V) will be specifically analyzed in conjunction with the principles illustrated in FIG. 7 and FIG. 8 in a next example.

A PWM table storage device may be implemented by a cache, a storage unit, a memory, etc., in the power tool, and may be updated and buffered in real time over the Cloud in a wireless way.

404' outputs a certain fixed duty ratio such as a duty ratio of 1; when the motor speed N2~N3 is in a range of 11100~12000 rpm, the controller 404' outputs a fixed duty ratio, duty1=0.95; when the motor speed N3~N4 is in a range of 10200~11100 rpm, the controller 404' outputs a fixed duty ratio, duty2=0.90; when the motor speed N4~N5 is in a range of 9300~10200 rpm, the controller 404' outputs a fixed duty ratio, duty3=0.85; when the motor speed N5~N6 is in a range of 8400~9300 rpm, the controller 404' outputs a fixed duty ratio, duty4=0.80. Every time the motor speed n is reduced by 900 rpm, the duty ratio PWM outputted from the controller 404' is reduced by 0.05. The variable $\Delta$n of the motor speed is set to 900 rpm and the variable $\Delta$PWM of the duty ratio outputted from the controller 404' has a function relationship with the variable $\Delta$n of the motor speed, that is, the variable $\Delta$PWM of the duty ratio is obtained with the function f($\Delta$x), where the variable $\Delta$n of the motor speed is 900 rpm and $\Delta$PWM is set to 0.05.

As shown in the above table 1, in a right column, when the battery pack is a 1P battery pack and the voltage V2 of the 1P battery pack is 23 V, when the motor speed N9 is greater than or equal to a predetermined value such as 11000 rpm, the controller outputs a certain fixed duty ratio such as a duty ratio of 1; when the motor speed N10~N11 is in a range of 10100~11000 rpm, the controller outputs a fixed duty ratio, duty5=0.95; when the motor speed N11~N12 is in a range of 9200~10100 rpm, the controller outputs a fixed duty ratio, duty6=0.90; when the motor speed N12~N13 is in a range of 8300~9200 rpm, the controller outputs a fixed duty ratio, duty7=0.85; when the motor speed N13~N14 is in a range of 7200~8300 rpm, the controller outputs a fixed duty ratio, duty8=0.80. Every time the motor speed n is reduced by 900 rpm, the duty ratio PWM outputted from the controller is reduced by 0.05. The variable $\Delta$n of the motor speed is set to 900 rpm and the variable $\Delta$PWM of the duty ratio outputted from the controller has a function relationship with the variable $\Delta$n of the motor speed, that is, the variable $\Delta$PWM of the duty ratio is obtained with the function f($\Delta$n), where the variable $\Delta$n of the motor speed is 900 rpm and $\Delta$PWM is set to 0.05.

In some other examples of the subject disclosure, when the variable $\Delta$n of the motor speed is set to any predetermined value such as 300 rpm, 500 rpm, 10000 rpm or 12000 rpm, $\Delta$PWM is set to any value between 0.01 and 0.2. That is to say, the control unit 404' is configured to determine the variable $\Delta$PWM of the duty ratio according to the variable

TABLE 1

| Speed/rpm | Battery Pack Voltage-V1 (A fully charged state with an open circuit voltage of 25.2 V) Duty Ratio | Speed/rpm | Battery Pack Voltage-V2 (A not fully charged state with an open circuit voltage of 23 V) Duty Ratio | . . . |
|---|---|---|---|---|
| N1 = 12000 above | 1 | N9 = 11000 above | 1 | |
| N2~N3 = 11100~12000 | duty 1 = 0.95 | N10~N11 = 10100~11000 | duty 5 = 0.95 | |
| N3~N4 = 10200~11100 | duty 2 = 0.90 | N11~N12 = 9200~10100 | duty 6 = 0.90 | |
| N4~N5 = 9300~10200 | duty 3 = 0.85 | N12~N13 = 8300~9200 | duty 7 = 0.85 | |
| N5~N6 = 8400~9300 | duty 4 = 0.80 | N13~N14 = 7200~8300 | duty 8 = 0.80 | |
| . . . | . . . | | . . . | |

For a clearer description, as illustrated in the above table 1, in the left column, when the battery pack is a 1P battery pack (in which the 1P battery pack refers to a battery pack composed of a plurality of single battery cells connected in series) and the voltage V1 of the 1P battery pack is 25.2 V, as well as when the motor speed N1 is greater than or equal to a predetermined value such as 12000 rpm, the controller $\Delta$n of the characteristic parameter of the motor 23, where the variable $\Delta$PWM of the duty ratio is obtained with the function f($\Delta$n) and ranges between 0.01 and 0.2. According to the variable $\Delta$PWM of the duty ratio, the drive signal is outputted to the drive circuit 406' to output a driving force for controlling the rotor of the motor to operate.

Here, the voltage V2 of the 1P battery pack in the right column is 23V and smaller than the voltage V1, 25.2V, of the 1P battery pack in the left column. When the 1P battery pack has the voltage V2, an initial value N9 of the motor speed is set to 11000 rpm and also a little smaller than an initial value N1, 12000 rpm, of the motor speed set when the 1P battery pack has the voltage V1. That is to say, the variable $\Delta$PWM of the duty ratio for the controller 404' is related to the variable $\Delta$n of the motor speed and is also limited by the voltage V of the 1P battery pack, that is, the variable $\Delta$PWM of the duty ratio for the controller 404' is obtained by a function f($\Delta$n, V).

In a case that different battery packs have different voltages and different motor speeds, the variable $\Delta$PWM of the duty ratio may be set between 0.01 and 0.2. More specifically, when the motor speed n is selected as a specific characteristic parameter of the motor 23, the variable $\Delta$PWM of the duty ratio and the variable $\Delta$n of the motor speed may have the following relationship: for battery packs with some voltages, when $\Delta$n has a variation range from 500 rpm to 1000 rpm or is any other value, the variable of the corresponding duty ratio is in a range of 0.01~0.1; for battery packs with other voltages, when $\Delta$n has a variation range from 1000 rpm to 1500 rpm or is any other value, the variable of the corresponding duty ratio is in a range of 0.1~0.2. That is to say, the battery packs with some voltages are applicable to the variable of the duty ratio with a range of 0.01~0.1 so that a maximum output torque is significantly improved and/or a maximum impulse current is significantly reduced; while the battery packs with other voltages are applicable to the variable of the duty ratio with a range of 0.1~0.2 so that the maximum output torque is significantly improved and/or the maximum impulse current is significantly reduced.

The control unit 404' outputs the corresponding drive signal to the drive circuit 406' according to the variable $\Delta$PWM of the duty ratio to output the driving force for controlling the rotor of the motor to operate. Since the duty ratio is adjusted in the range of 0.01 to 0.2 according to the function f($\Delta$n, V), a duty ratio, which makes a current $I_b$ on a power supply side smaller (i.e., is friendlier to the power supply device) when currents $I_m$ on the motor side are the same (i.e., performances of the motors are the same), may be obtained. By selecting the corresponding duty ratio of the drive signal in the PWM form in such a manner, the subject disclosure through the selection of the duty ratio can effectively control the maximum impulse current of the battery pack and ensure the maximum output torque of the motor 23 when necessary, thereby optimizing the overall working performance of the power tool.

It is known to those skilled in the art that different power tools have different parameters and different battery packs have different characteristics, so that different variables of the duty ratio may be matched. For example, in one example, the variation range 0.01~0.1 of the duty ratio is selected to match parameters of one power tool. In another example, the variation range 0.1~0.2 of the duty ratio is selected to match parameters of another power tool.

The above description is given for cases where the 1P battery pack has different voltages, and the controller 404' outputs the corresponding drive signal based on the variable $\Delta$PWM of the duty ratio. The variable $\Delta$PWM of the duty ratio is obtained with the function f($\Delta$n, V), where $\Delta$n is the variable of the motor speed and V is the voltage of the battery pack. In addition, in some other examples of the present invention, the variable $\Delta$PWM of the duty ratio for the controller 404' is also appropriately adjusted or corrected according to a number of P of the battery pack. For example, there are a 2P battery pack, a 3P battery pack, a 4P battery pack, ..., and an nP battery pack. The 2P battery pack refers to two 1P battery packs connected in parallel, the 3P battery pack refers to three 1P battery packs connected in parallel, the 4P battery pack refers to four 1P battery packs connected in parallel, and the nP battery pack refers to n 1P battery packs connected in parallel. In this case, $\Delta$PWM is obtained with a function f($\Delta$n, V, P).

It is to be noted that, in the examples of the subject disclosure, the variable $\Delta$PWM of the duty ratio for the controller 404' is obtained with the function f($\Delta$n, V, P), where $\Delta$PWM is mainly adjusted or controlled according to the variable $\Delta$n of the motor speed. In some other examples of the subject disclosure, $\Delta$PWM may be adjusted or controlled according to the characteristic parameter x of the motor 23, for example, the characteristic parameter x of the motor 23 may be at least one of the motor speed, a current, an output torque and a voltage. That is to say, the variable $\Delta$PWM of the duty ratio for the controller is obtained with the function f($\Delta$x, V, P), where $\Delta$x is variable(s) of one or more characteristic parameters of the motor.

Figure 5:
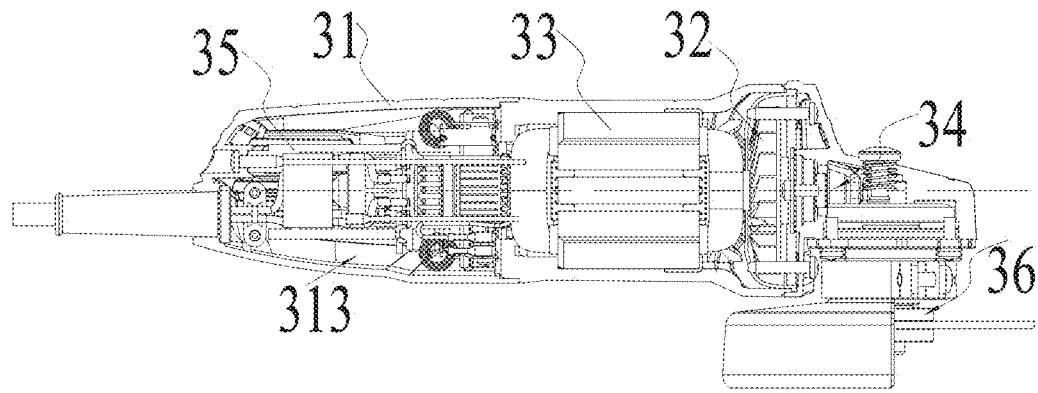
FIG. 5 is a schematic diagram illustrating an external structure of an angle grinder according to a third example of the subject disclosure.

In a third example of the subject disclosure, an angle grinder which acts as a representation of a power tool is described in conjunction with FIG. 5 to illustrate an application of a motor control technique to a power tool in the subject disclosure.

The power tool as shown in FIG. 5 has a mechanical structure which specifically includes: a housing 31, a motor 33, an output member 32 and a circuit component 35. Of course, in this example, the angle grinder may further include a transmission device 34 and a clamping device 36.

A receiving cavity 313 is formed inside the housing 31, and the receiving cavity 313 is for accommodating the motor 33, the transmission device 34 and the circuit component 35. A handle for a user to hold may also be formed on an outer surface of the housing 31. For the angle grinder, the housing 31 may be generally linear. The motor 33 is configured to drive the output member 32 to output a power. The motor 33 may further include a motor shaft for outputting the power. The output member 32 configured to output the power to the clamping device 36 to drive the clamping device 36 to rotate. The transmission device 34 is configured to implement transmission between the motor shaft of the motor 33 and the output member 32. The clamping device 36 may mount a grinding disc to the output member 32 so that the grinding disc is driven by the output member 32 to grind a workpiece. A fan may be further mounted within the housing 31 to dissipate heat from a heat generating device inside the power tool to ensure that the angle grinder can operate in a normal thermal environment.

Figure 6:
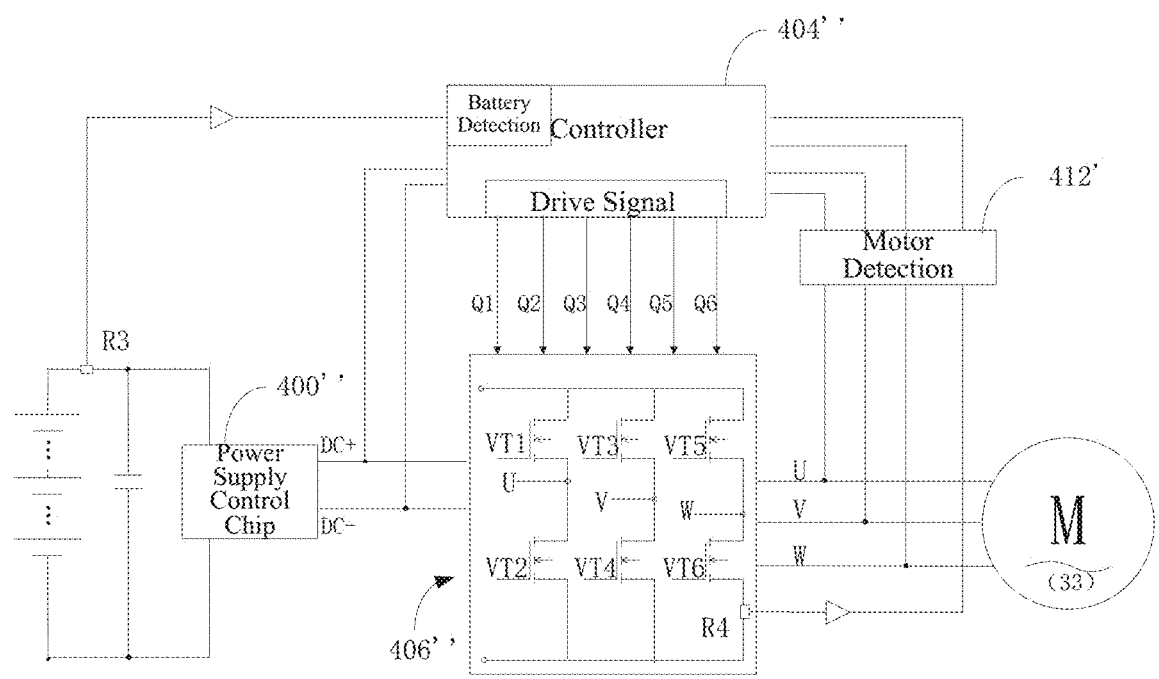
FIG. 6 is a schematic diagram of an internal circuit system according to the third example of the subject disclosure.

The operation of the angle grinder also needs to rely on the cooperative control of various electronic elements mounted on the circuit component 35. The circuit component 35 is accommodated within the housing 31. Referring to FIG. 6, the circuit component 35 specifically includes the following circuit: a power supply control chip 400", a battery detection module 402", a motor detection module 412', a controller 404" and a drive circuit 406". The power supply control chip 400", the battery detection module 402", the motor detection module 412', the controller 404", the drive circuit 406" and the motor 33 are all enclosed by the housing 31.

Referring to FIG. 6, the various circuit modules in the angle grinder cooperate in a similar manner as the various electronic devices in the electric drill in the first example. The only difference lies in that in this example, the motor detection module 412' is separately disposed outside the controller 404", and a function of a power supply device detection module, that is, a function for detecting a battery is implemented by a sampling port inside the controller 404". In this example, the motor detection module 412' may obtain a rotational position of a rotor of the motor 33 or a motor speed by sampling a phase current and/or a terminal voltage of the motor 33 in conjunction with corresponding calculations. The motor speed n reflects a characteristic parameter x of the motor 33. In this example, a size of a current signal outputted from a battery pack may be collected by a sampling resistor R3 connected in series to one side of the battery pack and is inputted to the battery detection module 402". The battery detection module 402" calculates and obtains a current, a number of level P and the like of the battery pack which are acted as a characteristic parameter V of a power supply device. The controller 404" performs functional operations according to the above motor speed n, the characteristic parameter V of the power supply device and the number of P of the battery pack to obtain a corresponding variable $\Delta PWM = f(\Delta n, V, P)$ of a duty ratio, and thus the duty ratio is determined. To simplify the calculation, the characteristic parameter of the power supply device in this example may also be a voltage of the battery pack. The duty ratio is calculated and obtained with the function $\Delta PWM = f(\Delta n, V, P)$. According to the duty ratio and the rotational position of the rotor of the motor, a corresponding drive signal is outputted to the drive circuit 406" to enable the drive circuit 406" to switch a drive state, thereby enabling a magnetic field generated by a stator to rotate to drive the rotor to rotate to drive the motor 33.

The duty ratio of the drive signal outputted from the controller 404" is specifically obtained by calculating the variable $\Delta PWM$ of the duty ratio with the function $\Delta PWM = f(\Delta n, V, P)$.

The battery detection module 402" first samples and acquires a practical working condition of the battery pack, such as the voltage V of the battery pack; and the motor detection module 412' calculates and obtains the characteristic parameter x of the motor such as the motor speed n. According to the voltage V of the battery pack, the motor speed n and the number of P of the battery pack, the variable $\Delta PWM = f(\Delta n, V, P)$ of the duty ratio under this working condition is calculated and obtained and a corresponding optimal duty ratio is calculated and obtained. A PWM signal is adjusted according to the duty ratio to obtain the drive signal suitable for a current working condition of the angle grinder. The controller outputs the drive signal to the drive circuit 406" according to the duty ratio and the rotational position of the rotor of the motor 33. Therefore, the drive circuit drives the motor 33 according to the drive signal.

In this example, the calculation of the function $f(\Delta n, V, P)$ may be directly performed by the controller 404" to obtain the corresponding data of the duty ratio and thus the PWM table storage device in the above example may be omitted. In this way, optimization selection of the corresponding optimal duty ratio under different working conditions may also be realized. The duty ratio is specifically a duty ratio of the drive signal for driving the motor 33 to operate under different characteristic parameters x of the motor and/or different working conditions of the battery pack. Similar to the above example, when the battery detection module 402" obtains the voltage V=25.2 V of the battery pack and the number of P of the battery pack is 1, a relationship between the variable $\Delta PWM$ of the duty ratio determined by the control module 404" according to the function $f(\Delta n, V, P)$ and the variable $\Delta n$ of the motor speed may be specifically as follows: when the variable $\Delta n$ of the motor speed is between 500 rpm and 1000 rpm, the variable $\Delta PWM$ of the duty ratio is in a range of 0.01 to 0.1; and when the variable $\Delta n$ of the motor speed is between 1000 rpm to 1500 rpm, the variable $\Delta PWM$ of the duty ratio is correspondingly in a range of 0.1 to 0.2.

Here, the function $f(\Delta n, V, P)$ may be obtained by the steps described below.

Figure 7:
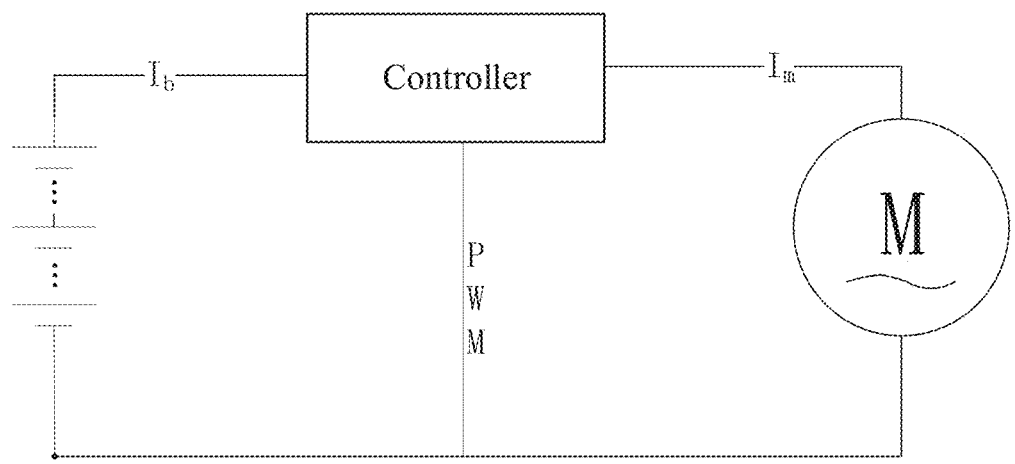
FIG. 7 is a schematic diagram of a principle of a simulation system in the subject disclosure.

A power tool simulation system model illustrated in FIG. 7 is established first according to specific circuit characteristic parameters of the power tool. The circuit characteristic parameters of the power tool to be considered in the model include the characteristic parameter of the power supply device and the characteristic parameter of the motor. The characteristic parameter of the power supply device may include, but is not limited to, a voltage of the power supply device, remaining power, a SOC parameter of the battery pack, an internal resistance of the power supply device, and the like. The characteristic parameter of the motor may include, but is not limited to, the motor speed, a position, a torque and the like.

An example in which the battery pack is taken as the power supply device is used here and a case in which an AC power supply is taken as the power supply device may be achieved similarly. In a power tool control model illustrated in FIG. 7, a current $I_b$ on a power supply side is outputted by the battery pack according to different numbers of P and/or characteristic parameters under working conditions, and the controller according to different duty ratios outputs the drive signal to drive the motor to operate. At this time, the motor outputs a corresponding current $I_m$ on a motor side according to the characteristic parameter corresponding to a working condition of the motor.

Simulation is performed respectively based on different working conditions of the battery pack and different characteristic parameters x of the motor, to respectively obtain a relationship between the duty ratio of the drive signal and the current $I_b$ on the power supply side and a relationship between the duty ratio of the drive signal and the current $I_m$ on the motor side under a working condition (different working conditions of the battery pack and different characteristic parameters x of the motor). For example, in an example in which the working condition of the battery pack is the voltage V2 of the battery pack and the characteristic parameter x of the motor falls into N10~N11, the relationship between the duty ratio of the drive signal and the current $I_b$ on the power supply side and the relationship between the duty ratio of the drive signal and the current $I_m$ on the motor side are simulated and obtained. The relationships may be represented by curves illustrated in FIG. 8.

Figure 8:
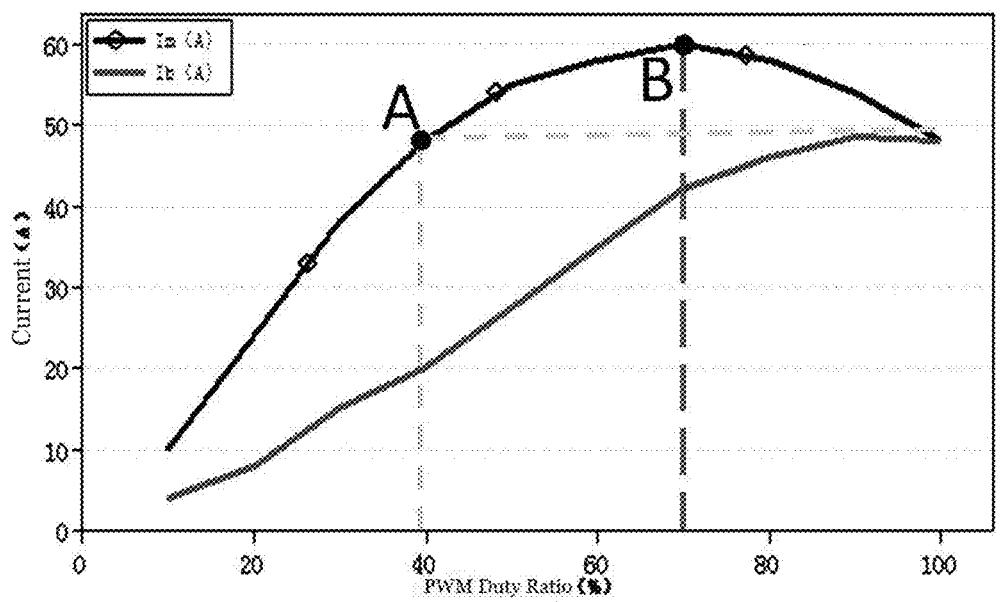
FIG. 8 illustrates a principle for selecting a PWM duty ratio under a first state in a simulation system.

Because the current $I_m$ on the motor side is proportional to an output torque of the motor, by querying FIG. 8, it is known that a highest point B of the curve of the current $I_m$ on the motor side is a point of a maximum output torque under this working condition, that is, is a point of optimal output performance of the motor. The duty ratio of the drive signal under this working condition is 65%. When the current $I_m$ on the motor side corresponding to the output torque of the motor is 49 A, two duty ratios may be found to implement the torque by querying the curve illustrated in FIG. 8. However, because the current $I_b$ on the power supply side corresponding to the duty ratio at a point A is smaller, it may be determined that the point A is a battery friendly point, and the duty ratio of the drive signal under this working condition is 39%.

According to an analysis of the working condition of the battery pack and the characteristic parameter x of the motor, it is determined whether to protect the battery or to output a large torque under the working condition, or a compromised solution is required for both of them. In the example in which the working condition of the battery pack is the voltage V2 of the battery pack and the characteristic parameter x of the motor falls into N10~N11, if it tends to protect the battery under one working condition, (that is, a maximum impulse current on the battery pack needs to be limited), accordingly, the duty ratio of 39% at the point A may be selected as the optimal duty ratio under this working condition; if it tends to output the large torque under another working condition, accordingly, the duty ratio of 65% at the point B may be selected as the optimal duty ratio under this working condition. Alternatively, the above duty ratios are compromised, and it is determined that the optimal duty ratio is a duty ratio corresponding to a point appropriate to the working condition between the point A and the point B. Generally, in this manner, the duty ratio needs to be adjusted between 0.02 and 0.08. The optimal duty ratio selected for this working condition is stored at a position corresponding to duty5 in table 1 according to the working condition V2 of the battery pack and N10~N11 of the characteristic parameter x of the motor. Similarly, the duty ratios corresponding to different working conditions in the above PWM table are determined one by one and stored in the table. Alternatively, a process of adjusting the duty ratio according to characteristics of the power tool may be fitted with the function f($\Delta$n, V, P), that is, the process of adjusting the duty ratio is fitted according to the characteristic parameter of the power supply device and the characteristic parameter of the motor. Alternatively, the above PWM table may be directly fitted. By replacing the storage of specific duty ratios with the calculation of the function f($\Delta$n, V, P), the duty ratio may be adjusted directly according to real-time working conditions.

Therefore, during using the power tool, once it is determined that a practical working condition falls into the working condition V2 of the battery pack and N10~N11 of the characteristic parameter x of the motor, duty 5 is determined as the corresponding duty ratio accordingly by directly querying the table or fitting via the function f($\Delta$n, V, P). The drive signal corresponding to the duty ratio is controlled, according to its corresponding policy, to be outputted to the drive circuit to drive the motor to operate. By selecting the optimal duty ratio in the simulation process, effects close to the simulation may be obtained in the practical applications, thereby limiting the maximum impulse current of the power tool, improving the maximum output torque, and being able to increase a ratio of the maximum output torque to a power supply capacity. Specifically, by using the above technology, the maximum output torque of the power tool may be not less than 5N·m, and/or the ratio of the maximum output torque of the power tool to the power supply capacity is not less than 3 Nm/Ah, and/or the maximum impulse current of the power tool does not exceed 30 A.

Under other operating conditions, the selection, storage and query mode of the duty ratio is similar to those described above, which is not repeated here.

It is understandable by those skilled in the art that when the power tool is nearly blocked under a working condition such as a low speed or a large torque, generally, an optimal performance point B is required to be selected as a basis of the duty ratio under the working condition to improve heavy load performance of the tool and avoid being blocked.

When the power tool is under a working condition of being completely blocked, the point A with smaller current may be selected to achieve a compromise between the protection of the battery and the output of the large torque.

The above selection of the optimal duty ratio under different working conditions may be applied to most power tools. When the above selection is applied to a specific power tool, it is only required to adjust the parameters in the power tool simulation system model shown in FIG. 7 according to use requirements and circuit characteristics of the power tool and perform the corresponding simulation to determine specific values of the duty ratio.

For the existing power tool, the subject disclosure does not need to make any change on the circuit hardware or mechanical structure of the power tool, and it is only required to pre-store the PWM table (table 1) corresponding to the tool or directly execute the function f($\Delta$n, V, P) through the operations of the control unit, so that the optimal control of the motor may be achieved at the optimal duty ratio, thereby optimizing the working performance of the power tool.

Referring to test data in FIG. 10 to FIG. 12, the subject disclosure can easily control the maximum impulse current of the battery pack in the power tool to be less than 30 A and the maximum output torque of the power tool to be not less than 5N·m. In particular, in the locked rotor state illustrated in FIG. 12, for example, when the motor speed is 20% of or below of the original speed, a locked rotor current of the power tool may be limited to 70 A or below.

The above illustrates and describes basic principles, main features and advantages of the subject disclosure. It is to be understood by those skilled in the art that the above examples do not limit the subject disclosure in any form, and all solutions obtained by means of equivalent substitution or equivalent transformation fall within the protection scope of the appended claims.

What is claimed is:

1. A power tool, comprising:
a motor, comprising a stator and a rotor;
a transmission device, configured to connect the rotor to a tool accessory;
a drive circuit, configured to output a switch signal to drive the rotor of the motor to operate;
a control unit, configured to output a drive signal to control the drive circuit; and
a power supply device, configured to supply power to the motor, the drive circuit, and the control unit;
wherein the control unit is configured to determine a variable $\Delta$PWM of a duty ratio according to a variable $\Delta$x of a characteristic parameter of the motor, wherein the variable $\Delta$PWM of the duty ratio is obtained by a function f($\Delta$x) and is within a range of 0.01 to 0.1, and according to the variable $\Delta$PWM of the duty ratio, output the drive signal to the drive circuit to control the rotor of the motor to operate to output a driving force.

2. The power tool of claim 1, further comprising a motor detection module configured to detect and obtain the characteristic parameter x of the motor; wherein the motor detection module is integrated into the control unit or disposed separated from the control unit.

3. The power tool of claim 1, wherein the characteristic parameter x of the motor comprises at least one of a motor speed, a current, or an output torque.

4. The power tool of claim 1, wherein the power supply device comprises a battery pack composed of a plurality of single battery cells connected in series.

5. The power tool of claim 1, wherein the variable $\Delta$x of the characteristic parameter of the motor is a variable $\Delta$n of a motor speed.

6. The power tool of claim 5, wherein, when the variable $\Delta n$ of the motor speed is within a range from 500 rpm to 1000 rpm, the corresponding variable $\Delta PWM$ of the duty ratio is within a range from 0.02 to 0.05, and, when the variable $\Delta n$ of the motor speed is within a range of 1000 rpm to 1500 rpm, the corresponding variable $\Delta PWM$ of the duty ratio is within a range from 0.05 to 0.08.

7. A power tool, comprising:
a motor, comprising a stator and a rotor;
a transmission device, configured to connect the rotor to a tool accessory;
a drive circuit, configured to output a switch signal to drive the rotor of the motor to operate;
a control unit, configured to output a drive signal to control the drive circuit; and
a battery pack, configured to supply power to the motor, the drive circuit and the control unit;
wherein the control unit is configured to determine a variable $\Delta PWM$ of a duty ratio according to a variable $\Delta x$ of a characteristic parameter of the motor, wherein the variable $\Delta PWM$ of the duty ratio is obtained by a function $f(\Delta x)$ and is within a range of 0.1 to 0.2, and to output the drive signal to the drive circuit according to the variable $\Delta PWM$ of the duty ratio, to control the rotor of the motor to operate to output a driving force.

8. The power tool of claim 7, wherein the characteristic parameter x of the motor comprises at least one of a motor speed, a current, or an output torque.

9. The power tool of claim 7, wherein the variable $\Delta x$ of the characteristic parameter of the motor is a variable $\Delta n$ of a motor speed.

10. The power tool of claim 9, wherein, when the variable $\Delta n$ of the motor speed is within a range from 500 rpm to 1000 rpm, the corresponding variable $\Delta PWM$ of the duty ratio is within a range from 0.02 to 0.05 and, when the variable $\Delta n$ of the motor speed is within a range of 1000 rpm to 1500 rpm, the corresponding variable $\Delta PWM$ of the duty ratio is within a range from 0.05 to 0.08.

11. A power tool, comprising:
a brushless motor, comprising a stator and a rotor;
a transmission device, configured to connect the rotor to a tool accessory;
a drive circuit, configured to output a switch signal to drive the rotor of the brushless motor to operate;
a control unit, configured to output a drive signal to control the drive circuit; and
a power supply device, configured to supply power to the brushless motor, the drive circuit, and the control unit;
wherein the control unit is configured to determine a variable $\Delta PWM$ of a duty ratio according to a variable $\Delta x$ of a characteristic parameter of the brushless motor and a characteristic parameter V of the power supply device, wherein the variable $\Delta PWM$ of the duty ratio is obtained by a function $f(\Delta x, V)$ and is within a range of 0.01 to 0.2, and to output the drive signal to the drive circuit according to the variable $\Delta PWM$ of the duty ratio, to control the rotor of the brushless motor to operate to output a driving force.

12. The power tool of claim 11, wherein the control unit is configured to determine the variable $\Delta PWM$ of the duty ratio according to the variable $\Delta x$ of the characteristic parameter of the brushless motor, a number of P of a battery pack and the characteristic parameter V of the power supply device, wherein the variable $\Delta PWM$ of the duty ratio is obtained by a function $f(\Delta x, V, P)$ and is within a range from 0.01 to 0.1 or from 0.1 to 0.2; and to output the drive signal to the drive circuit according to the variable $\Delta PWM$ of the duty ratio, to output the driving force for controlling the rotor of the brushless motor to operate.

13. The power tool of claim 11, wherein the power tool has a maximum output torque greater than or equal to 5N·m.

14. The power tool of claim 11, wherein the variable $\Delta x$ of the characteristic parameter of the motor is a variable $\Delta n$ of a motor speed.

15. The power tool of claim 14, wherein, when the variable $\Delta n$ of the motor speed is within a range from 500 rpm to 1000 rpm, the corresponding variable $\Delta PWM$ of the duty ratio is within a range from 0.02 to 0.05 and, when the variable $\Delta n$ of the motor speed is within a range of 1000 rpm to 1500 rpm, the corresponding variable $\Delta PWM$ of the duty ratio is within a range from 0.05 to 0.08.

\* \* \* \* \*